United States Patent
May

(10) Patent No.: US 7,140,258 B2
(45) Date of Patent: Nov. 28, 2006

(54) MAGNETIC-BASED FORCE/TORQUE SENSOR

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 252 days.

(21) Appl. No.: 10/239,545

(22) PCT Filed: Mar. 28, 2001

(86) PCT No.: PCT/EP01/03562

§ 371 (c)(1),
(2), (4) Date: Dec. 19, 2002

(87) PCT Pub. No.: WO01/73390

PCT Pub. Date: Oct. 4, 2001

(65) Prior Publication Data

US 2003/0115972 A1   Jun. 26, 2003

(30) Foreign Application Priority Data

Mar. 28, 2000 (GB) .................................. 0007532.5

(51) Int. Cl.
*G01B 7/16* (2006.01)
(52) U.S. Cl. ...................................................... 73/779
(58) Field of Classification Search ........... 73/862.334, 73/862.335, 862.336, 761–763, 862.59, 779, 73/862.331–862.333, 862, 639
See application file for complete search history.

(56) References Cited

U.S. PATENT DOCUMENTS

| | | | |
|---|---|---|---|
| 4,637,254 A * | 1/1987 | Dyben et al. .................. 73/314 |
| 4,933,580 A * | 6/1990 | Ishino et al. .................... 310/26 |
| 4,933,584 A * | 6/1990 | Harms et al. ................ 310/162 |
| 4,967,598 A * | 11/1990 | Wakatsuki et al. ........ 73/514.12 |
| 5,321,985 A * | 6/1994 | Kashiwagi et al. ..... 73/862.335 |
| 5,331,854 A * | 7/1994 | Hulsing, II ............... 73/514.37 |
| 5,353,649 A * | 10/1994 | Hase et al. ............. 73/862.335 |
| 5,408,253 A * | 4/1995 | Iddan .......................... 347/260 |
| 5,442,966 A * | 8/1995 | Hase et al. ............. 73/862.335 |
| 5,574,231 A | 11/1996 | Blomkvist et al. ...... 73/862.336 |
| 5,591,925 A * | 1/1997 | Garshelis ............... 73/862.335 |
| 5,813,280 A * | 9/1998 | Johnson et al. ................ 73/643 |

(Continued)

FOREIGN PATENT DOCUMENTS

DE        42 03 124        8/1992

(Continued)

OTHER PUBLICATIONS

"Sensors, vol. 5: Magnetic Sensors," by Göpel, et al., 1989, VCH Verlagsgesellschaft, Weinheim, DE XP-002172220.

*Primary Examiner*—Max Noori
(74) *Attorney, Agent, or Firm*—Blank Rome LLP

(57) ABSTRACT

A force transducer element (20) comprises a body (22) of magnetisable material having at least one magnetised region (30) at an angle, say 45°, to the force-sensing direction (P—P). Preferably there are a plurality of parallel magnetised regions of alternating opposite polarity of magnetisation to form closed loops (43p, 43n). The element may be a block having opposite force receiving surfaces (24, 24'). The body (122) may contain plural transducer elements (120a, 120b) angled to one another to resolve force directions. The principle is extended to a circular transducer element (243). The invention may be implemented in a flexible magnetic tape. Another embodiment (300) is realised in a planar structure in which a ferromagnetic core (310) is subject to a magnetic field (326) at an angle to the direction (F) of force application generated by laterally offset coils (312, 314). A sensor device (330) is fabricated in the structure.

28 Claims, 10 Drawing Sheets

U.S. PATENT DOCUMENTS

| | | | |
|---|---|---|---|
| 5,889,215 A * | 3/1999 | Kilmartin et al. | 73/862.335 |
| 6,098,468 A * | 8/2000 | Mohri et al. | 73/862.333 |
| 6,295,185 B1 * | 9/2001 | Stefansky | 360/294.5 |
| 6,467,360 B1 * | 10/2002 | Bogdanov | 73/862.333 |
| 6,581,480 B1 * | 6/2003 | May et al. | 73/862.333 |

FOREIGN PATENT DOCUMENTS

| | | |
|---|---|---|
| WO | WO 99/56099 | 11/1999 |

* cited by examiner

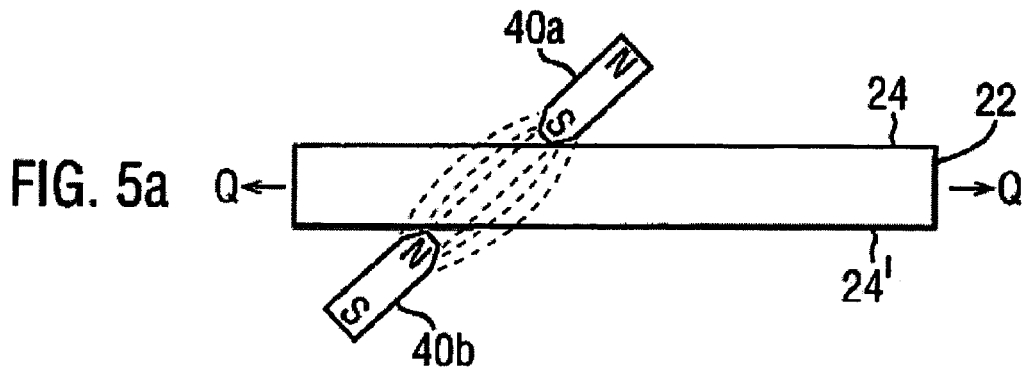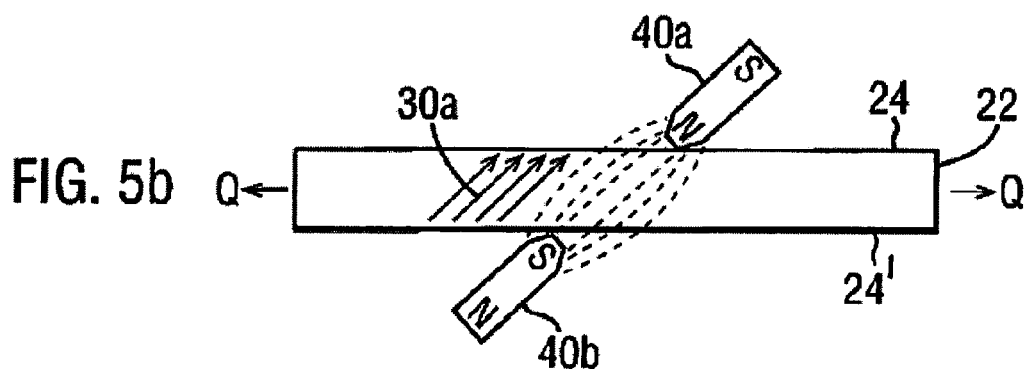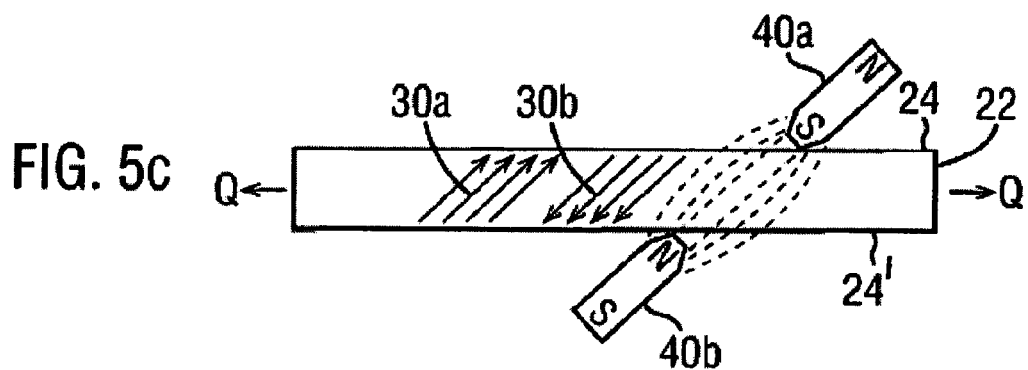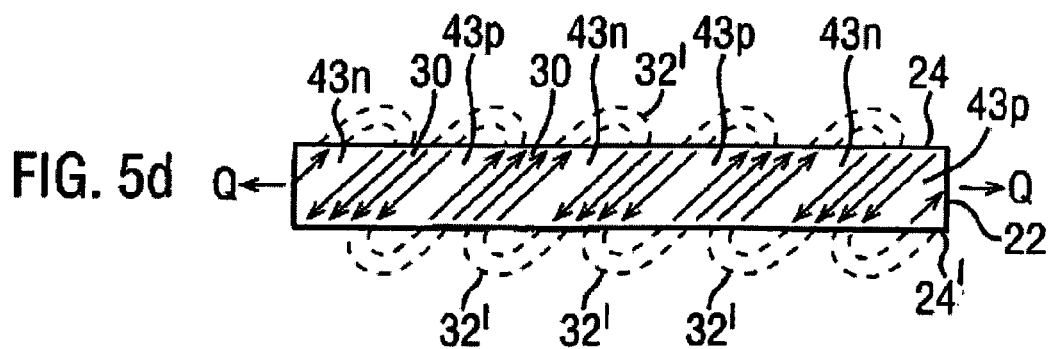

FIG. 7a
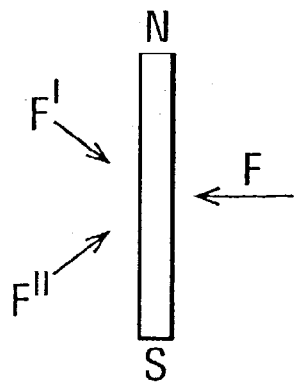
FIG. 7b
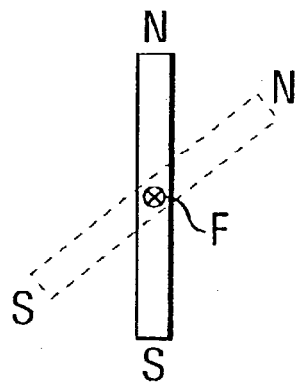
FIG. 8a 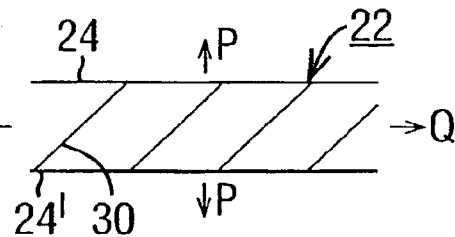 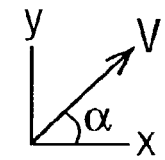
FIG. 8b 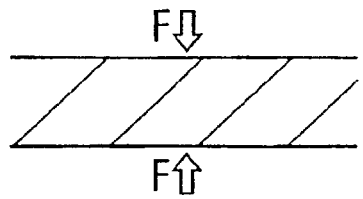 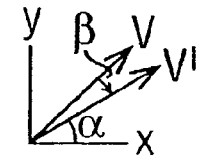
FIG. 8c 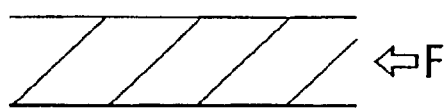 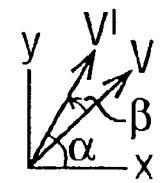
FIG. 8d 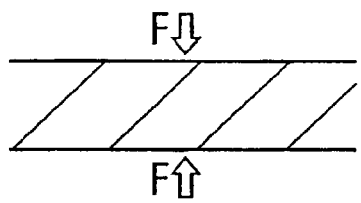 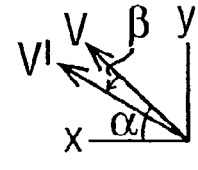
FIG. 8e 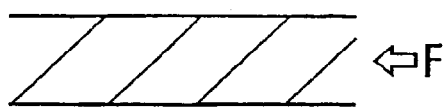 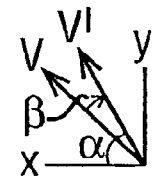

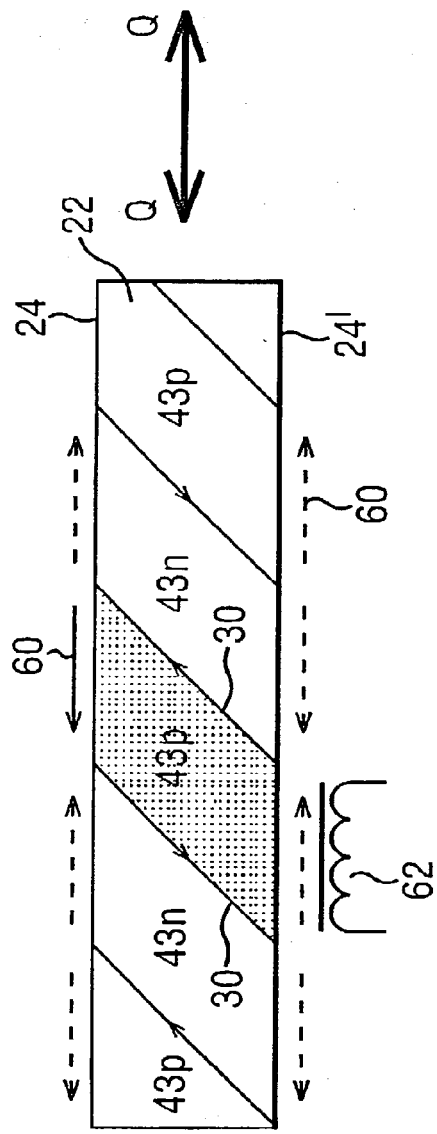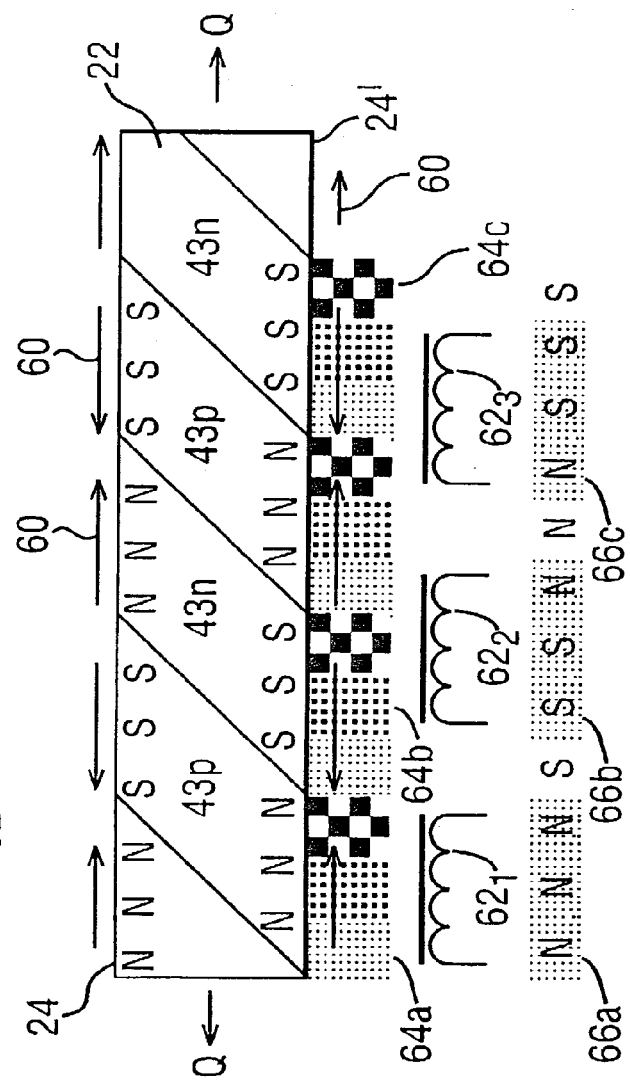
FIG. 10
FIG. 11

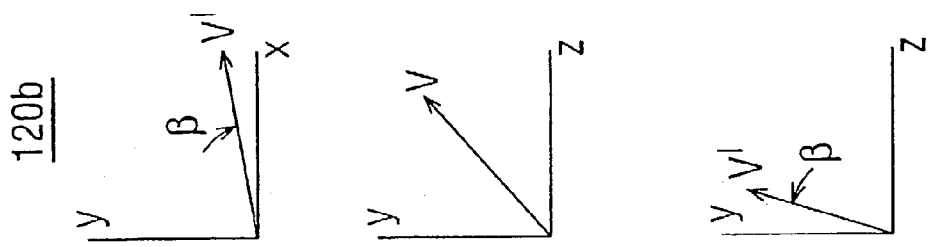
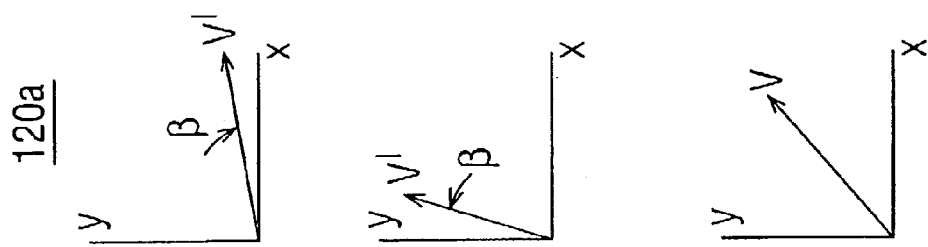
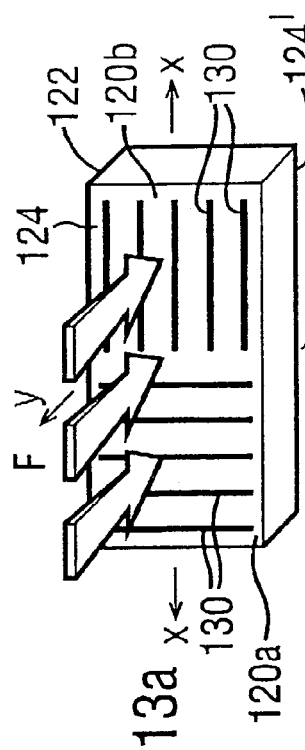
FIG. 13a
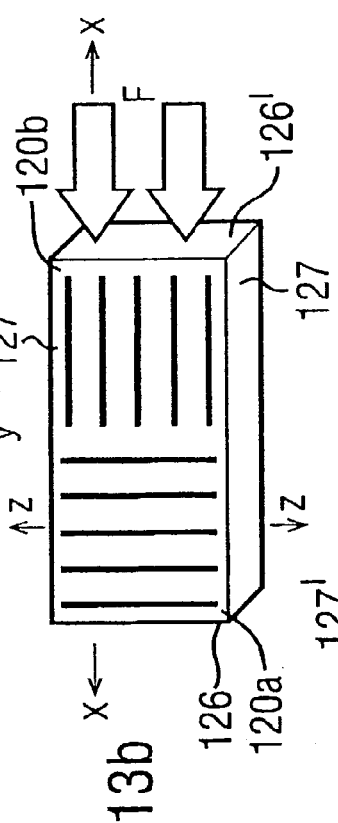
FIG. 13b
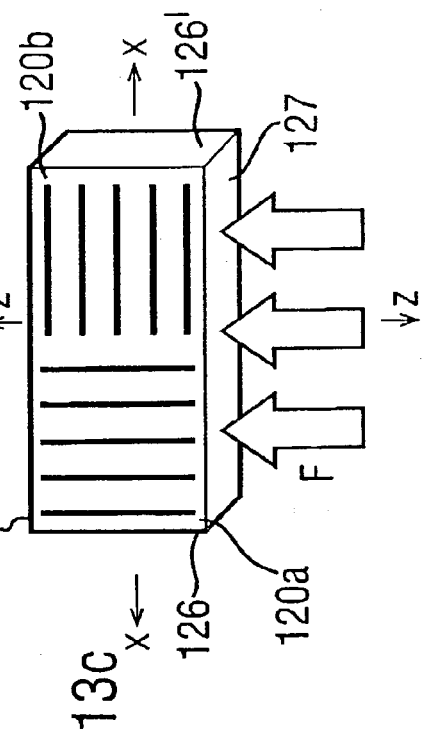
FIG. 13c

US 7,140,258 B2

MAGNETIC-BASED FORCE/TORQUE SENSOR

FIELD OF THE INVENTION

This invention relates to a transducer element supporting a magnetic field and to transducer arrangements and system using such an element.

BACKGROUND TO THE INVENTION

There has been a growing interest in transducer arrangements that provide non-contacting sensing of force or torque transmitted to a transducer element which has a magnetic field associated therewith.

One technology of this general type already established is that dependent on magneto-elasticity. A transducer element subject to torque has a circumferential closed magnetic field stored therein and emanates a torque-dependent external field. Examples of magneto-elastic transducers are disclosed in U.S. Pat. Nos. 5,351,555, 5,465,627 and 5,520,059 and in published PCT application WO99/21150 and WO99/21151. Reference may also be made to published PCT application WO99/56099 which discusses magnetoelastic transducers both for torque and force measurement. Magnetoelasticity is generally understood to be part of a wider phenomenon of magnetization, known as magnetostriction.

It is known that ferromagnetic materials undergo a dimensional change when subject to a magnetizing field. Conversely a magnetized material subject to stress and the resulting strain will be subject to a change in dimension which in turn has an effect on the magnetic field.

SUMMARY OF THE INVENTION

It may be the case that some of the embodiments of the invention described below involve the phenomenon of magnetostriction in their operation. What will be described are transducer elements and transducer systems which involve bodies of material in which there are stored magnetic regions, or which support a magnetic field in the sense of being permeable to fields for interaction with it.

Aspects and features of the present invention for which protection is presently sought are set forth in the claims following this description.

The invention and its practice will be better understood from the following description taken in conjunction with the accompanying drawings in which:

FIGS. 5a–5d show stages in the magnetization of a transducer element leading to the final magnetized element of FIG. 5d.

FIGS. 7a and 7b illustrate null directions for force application to the magnet region 30;

FIGS. 8a to 8e illustrate magnetic vector responses to applied forces in the P—P and Q—Q directions;

FIG. 10 illustrates the placement of a magnetic field sensor with respect to the magnetic cells in the body of a transducer element;

FIG. 11 is a view similar to that of FIG. 10 showing the placement of an array of sensors whose pitch is staggered with respect to that of the magnetic cells;

FIGS. 13a–13c show a two-element transducer body structure in which the two transducer elements are orthogonally arranged, together with magnetic vector diagrams relating to different forces applied to the body.

FIG. 18c illustrates a variation of the structure of FIG. 18a.

DESCRIPTION OF PREFERRED EMBODIMENTS

Figure 1:
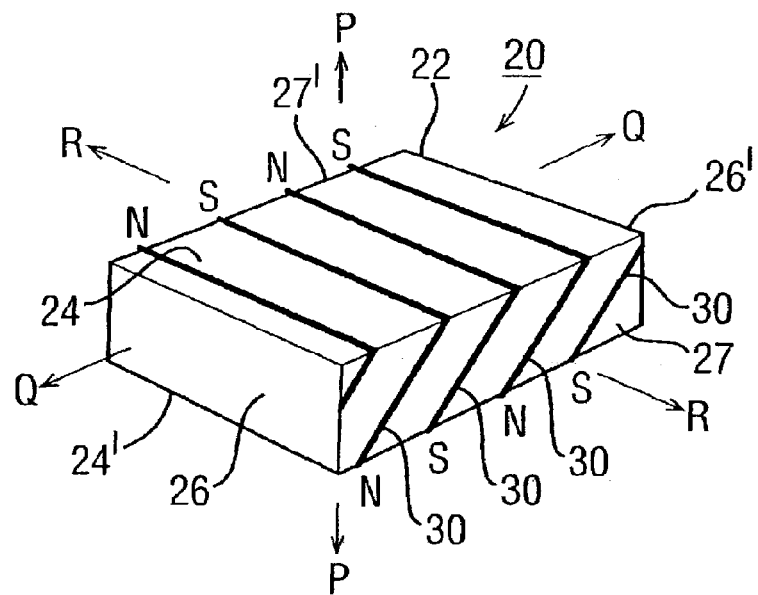
FIG. 1 is a perspective view of a transducer element having stored magnetic regions according to the invention and defining axes of response.

FIG. 1 shows a transducer element 20 in the form of a rectangular block 22. It is assumed that block 22 is of a ferromagnetic material capable of storing internal magnetization fields. The stored field pattern is described below. It is also assumed for this initial discussion that the block is of significant thickness (direction P—P), width direction Q—Q) and length (direction R—R). These are mutually orthogonal axes which are also referred to in vector diagrams below as the y, x and z axes respectively. As will be discussed further below, the invention can be applied with elements of widely varying thickness as exemplified by the very thin coatings on magnetic recording tape to bodies of ferromagnetic material of 1 cm. or more thickness. A magnetic tape may typically have a backing of 50 micron thickness to which is applied a magnetic coating of 2.5–5 microns. For immediate purposes the block 22 will be considered as a rigid body having a thickness of a few millimeters.

Block 22 has a primary pair of parallel opposite surfaces 24, 24' for receiving a load force in the direction of axis P—P normal to surfaces 24, 24'. This load force causes a detectable change in the magnetic field pattern associated with the magnetization stored in block 22. The change in the magnetic field pattern is detected by means which is not shown in FIG. 1 and which will be described below. Block 22 also has a second pair of parallel opposite surfaces 26, 26' the application of a force across which in the direction of axis Q—Q will also cause a detectable change in the magnetic field pattern. The application of a force across the third pair of parallel opposite surfaces 27, 27', that is in the direction of axis R—R causes no change in the magnetic field pattern for reasons which will become clearer when the stored magnetization is described below. It will be appreciated that the axes P—P, Q—Q and R—R are mutually orthogonal. In describing vector components of the magnetic field below in terms of Cartesian x, y co-ordinates, the x-axis is Q—Q and the y-axis P—P.

The magnetization stored in the transducer block 22 will now be described with reference to FIGS. 1, 2 and 3. It will be appreciated that the magnetization illustrated in FIGS. 1, 2 and 3 and the figures generally is simplified for clarity of illustration. The magnetic fields are likewise simplified. The nature of the magnetized regions supportable by an element is dependent on thickness as are the magnetic fields associated with it, particularly the distribution as between the field within the element and that external to it. Another factor affecting performance is the degree of magnetic saturation of the material. The magnetic permeability of the material is yet another factor.

For example, a thin element such as a tape coating may be readily saturated and the field due to the stored magnetization exists substantially externally of the tape. As will become clear the magnetization is such as to act to create closed magnetic field loops. In a thicker body of a ferromagnetic material, say a few millimeters thick, the stored magnetization and the field associated with it may exist primarily within the body. Different placements of magnetic field detectors will be described below. The practicality of one placement as against another will depend on the relevant dimensions of the detector with regard to those of the transducer element.

Looking now at the magnetization of the block 22 in FIG. 1, as stated it is assumed that the block is of ferromagnetic material having a thickness of say a few millimeters. Magnetized regions 30 are illustrated as dark regions being formed in planes that extend parallel to the axis R–R. Each region extends as a North-South (NS) magnet between surfaces 24, 24' and lies at an angle to the direction (P—P) in which a load force applied across surfaces 24, 24' acts through the material of block 22. The plane of each magnetic region 30 is inclined to the direction of the strain induced in the material. The angle of inclination is illustrated as 45° to the surfaces 24, 24'. Other angles may be chosen but as the limit of 90° is approached ambiguity in measurement may result and at the other limit of 0° (direction of axis Q—Q) no field change can be expected for forces in the direction P—P. As is seen in FIG. 1, next adjacent regions 30 are of opposite polarity. Put another way the regions alternate in polarity at surfaces 24, 24'. There should be at least two opposite polarity regions and preferably three and the number may be greater than this.

Figure 2:
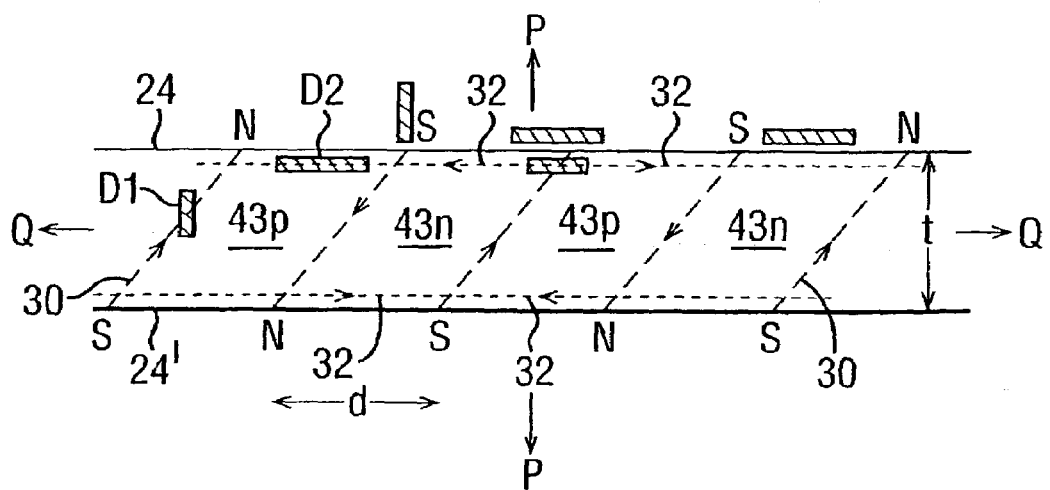
FIG. 2 is a side view of a transducer element illustrating the magnetized regions and associated internal magnetic fields, together with possible detector placements.

FIG. 2 represents the magnetization of block 22 as it extends in the widthwise direction of axis Q—Q. Five regions 30 of alternating NS polarity are shown. Each region such as 30, has flux linkages 32 to its neighboring opposite polarity regions as shown by arrows 32. The flux from each pole diverges in two links with the immediate neighboring poles. Thus cells 43 of closed magnetic loops are established which are designated 43$p$ and 43$n$ respectively in accord with the polarity (direction of flux circulation) of the loops.

The cell loops 43 are shown as contained within the material of body 22. There will inevitably be some fringing external flux which diverges from each N and S magnetic pole at the surfaces 24, 24' similarly to the internal flux. It will of course be appreciated that the regions 30 are of significant width in the Q—Q direction and the distribution of internal versus external flux is dependent to some extent on the permeability of the material and the spacing d between next adjacent regions. It has so far been found empirically that a spacing d should be greater than the material thickness t (thickness in the P—P direction) and that a d/t ratio of about 2 provides good results. The flux path in each loop 43 is shown as angular whereas it will be appreciated that the paths are arcuate, particularly as regards the linking flux 32. This is of importance in relation to the optimum placement of magnetic field detectors in accord with the concept of magnetic vector shift with strain as is discussed below.

Figure 3:
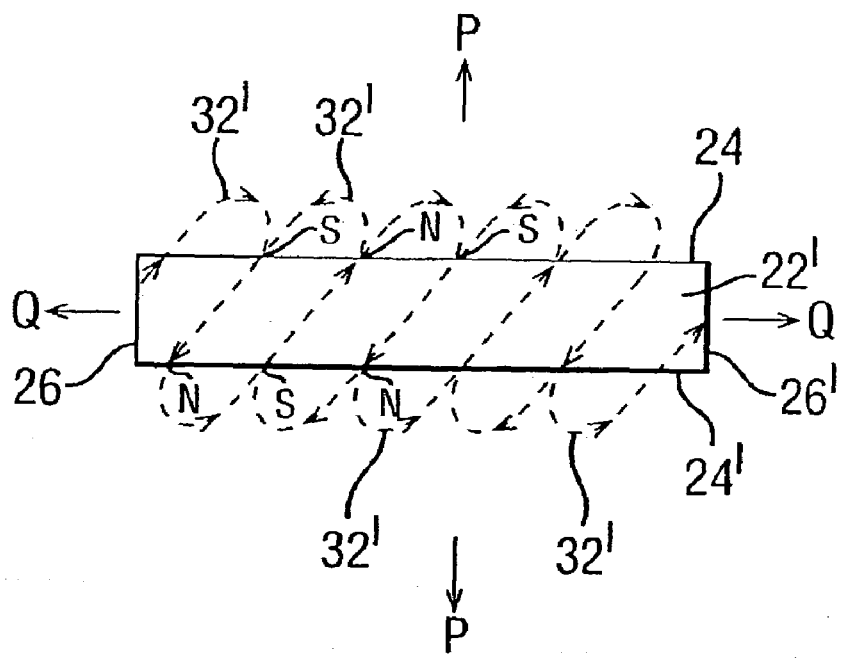
FIG. 3 is a side view of a transducer element illustrating the magnetized regions and associated external magnetic fields.

Some of the aspects of flux distribution raised in the foregoing paragraph may be better so n with reference to FIG. 3. FIG. 3 again shows the transducer block but the flux pattern illustrated is more likely to be appropriate to a thin layer or film 22' in that the linking magnetic flux lies predominantly outside the layer 22'. Within the layer 22' the same alternating pattern of alternately polarized NS regions 30 is established. The same spacing/thickness (d/t) considerations still apply. In this case the regions 30 tend to be separate magnets which are not linked within the material. A very thin material will tend to prevent significant internal flux linkage as may the physical formation of the material in the thin layer. Consequently, a higher proportion of flux 32' will be generated outside the layer adjacent its surfaces 24, 24'. As in FIG. 2 the flux from each region 30 diverges to form magnetic loops with the neighboring opposite polarity regions.

The establishment of flux outside the magnetized transducer body is enhanced by the ferromagnetic material being magnetized to saturation in regions 30. In general it is preferred that saturation magnetization be employed, whether the sensors are to be plated internally or externally of the body. Examples of both will be described below.

In order to sense the magnetic flux, and particularly the changes due to a load force acting on transducer element 20 through surfaces 24, 24', one or more magnetic field detectors are required. Preferably they should be directional, that is sensitive to the orientation of the detector relative to the field being sensed This is found in many known magnetic flux sensors including the saturating inductor type disclosed in published PCT application WO98/52063 and Hall effect sensors. Magnetoresistive sensors can also be manufactured in a directional form. Hall effect sensors may be advantageous because the field-sensitive element itself is very small in comparison with the saturating inductor type of device which typically has a length dimension of a few millimeters. The smaller size of the field sensitive element can assist in the orientation of the sensor in the local magnetic field.

As will be shown detectors or sensors can be placed within or external to the transducer element, though where the elements used are too thin, only external sensors are feasible.

The magnetic field loops associated with the transducer element will have variations in magnetic field strength and/or direction of a local magnetic vector that is a function of strain in the material caused by the applied force in direction of axis P—P. Such changes can be sensed with directional field sensors. The sensor may respond to a change in a field component in a given direction resulting from a change in the direction of the magnetic field vector at the point of placement of the sensor. Reverting to FIG. 2 examples are given of sensor placements, the sensors being generally denoted by the reference letter D.

FIG. 2 illustrates three sensor placements within a transducer body and three external to the body adjacent the load force receiving surface 24. The sensors are represented by shaded elongate rectangles. In each case the maximum response of the sensor is along the long axis of the rectangle. The locations and orientations shown are by way of example: they are not intended to be exhaustive: nor are the illustrated sensor dimensions relative to the cell dimensions intended to indicate practical values, particularly where small sensor elements such as Hall effect devices are used.

Sensor D1 is located to intersect a magnetized region 30 at an angle to the magnetic field. It is shown as oriented in the direction P—P, i.e. at 45° to the field. Sensor D2 is shown in a position between two regions 30 to intercept linking flux 32. D2 is shown oriented parallel to surface 24, i.e. parallel to axis Q—Q. The optimum position of D2 in the Q—Q direction may require some experiment. It is dependent on the materials, its thickness, hardness and exact manner of magnetization.

Figure 4:
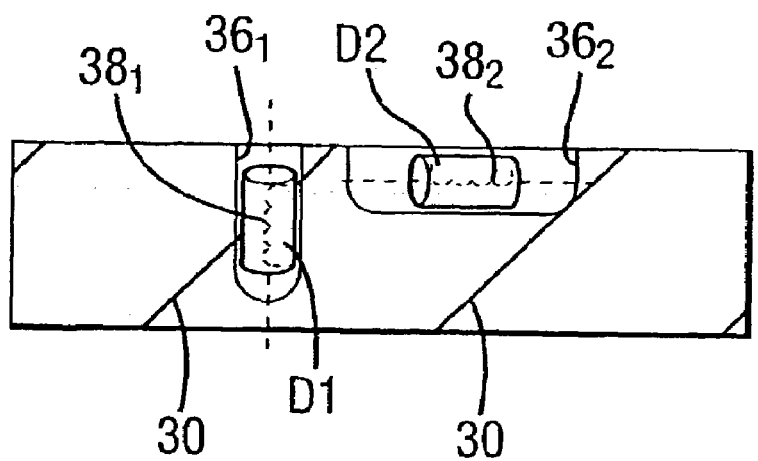
FIG. 4 is a side view of a transducer element showing two internal placements of a magnetic field detector shown in FIG. 2.

FIG. 4 is a further diagrammatic illusion of the manner in which sensors D1 and D2 can be located internally in a transducer element by locating them in respective recesses 361, 362 opening into surface 24. The detectors are specifically shown as of the saturable inductor type having a maximum response along the inductor axis. Inductor 38, of detector D1 is oriented normal to surface 24: inductor 382 of detector D2 is parallel to surface 24. D1 intersects a region 30: D2 is positioned in the linking flux between two opposite polarity regions 30.

Looking again at FIG. 2, a third internal sensor location is shown denoted $D2_1$. This is similarly positioned relative to surface 24 as is sensor D2 but the location is in a zone of one pole of a magnetized region 30 where the flux is diverging in opposite directions. As already stated, the flux paths illustrated in FIG. 3 are greatly simplified. The optimum position for D2, may prove to be to one side or other of the point of divergence.

FIG. 2 also shows externally located sensors D3, D4 and $D4_1$. D3 is located in alignment with axis P—P adjacent one pole of a magnetized region 30 where flux is commencing to diverge (see FIG. 3). D4 is located in alignment with axis Q—Q between neighboring regions in a position corresponding to D2; and $D4_1$ is located in alignment with axis Q—Q adjacent one pole of a region 30 where flux is commencing to diverge. It is in a position corresponding to $D2_1$. Optimum placement for the parameters of a given transducer element may be found experimentally. It is expected that the sensor will normally be placed as close to surface 24 as possible to receive the highest field strength.

It will be understood that the field patterns shown in the various figures are highly diagrammatic. In particular fields do not follow sharp bends unless constrained to do so. The relevant portion of a field which a sensor placement is to detect may be small. A sensor such as a saturating inductor sensor may have an inductor (coil) length typically of 4–8 mm. It may be difficult to position such a sensor to respond essentially to a desired portion of the field pattern. It may cover a wider portion of the pattern leading to a "smearing" of its response or in some cases to a tendency to respond to counteracting field portions. In this respect a Hall effect device has advantage. Typically the sensor element of a Hall effect or magnetoresistive detector is of about 400 micron size so that it can be positioned more precisely to respond only to the desired portion of the field pattern.

The means of magnetization of the transducer element so far described will now be described with reference to FIGS. 5a–5d. FIGS. 5a–5c show stages of magnetization, while FIG. 5d shows the resulting magnetized regions and linking flux.

FIGS. 5a to 5c show the manner in which the inclined regions of magnetization of FIGS. 1–3 can be generated. FIG. 5a shows a rectangular block 22 (it may be a thinner layer (film or coating)) of ferromagnetic material which is initially in an unmagnetized condition. It is of the rectangular shape above described having the pair of opposite surfaces 24, 24'. A pair of magnets 40a, 40b are placed adjacent surfaces 24, 24' respectively with opposite poles facing each other diagonally with respect to the surfaces. The field applied in block 22 is shown by the dashed lines. It has a main axis at 45° with respect to the surfaces. The applied field strength should be sufficient to induce a remanent magnetization in the material when the magnets 40a, 40b are moved away. FIG. 5b shows the next stage of magnetization. A remanent diagonally magnetized region 30a remains after transfer of the magnets 40a, 40b from the position of FIG. 5a to that of FIG. 5b. FIG. 5b shows the magnets moved laterally (in the direction of axis Q—Q) and applied diagonally adjacent surfaces 24, 24' but with opposite polarity of magnetization. This generates an opposite polarity region 30b seen in FIG. 5c in which the magnets 40a, 40b have been moved to the next stage with the polarity alternated back to that of FIG. 5a. The procedure is continued as far as is required.

FIG. 5d shows the successive magnetized regions. In contrast to the earlier figures the regions 30 are shown as having real width (represented by plural arrows). The linking flux 32' is shown as being predominantly external, as is more appropriate to a thin layer (FIGS. 3 and 4), but may be predominantly contained within a thicker block as in FIG. 2, or any distribution of external to internal flux between the two. Each region 30 produces field that diverges to produce magnetic loops with the two next adjacent regions. The now magnetized transducer element is magnetically comprised of a set of cells 43 of alternate polarity 43n, 43p in which each cell has a magnetic loop of a given polarity of field "circulation" and each region 30 is associated with two opposite polarity cells.

Before going on to describe the application of the transducer element into a transducer system and various developments of the basic structure so far described, some description will be given of the concept of strain (force) dependent magnetic vectors in the operation of the transducer element.

Figure 6A:
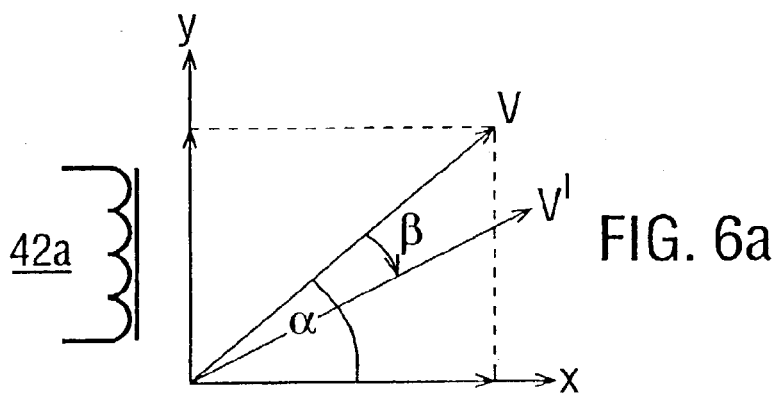
FIGS. 6a and 6b show magnetic vector changes under compressive and tensile forces respectively.
Figure 6B:
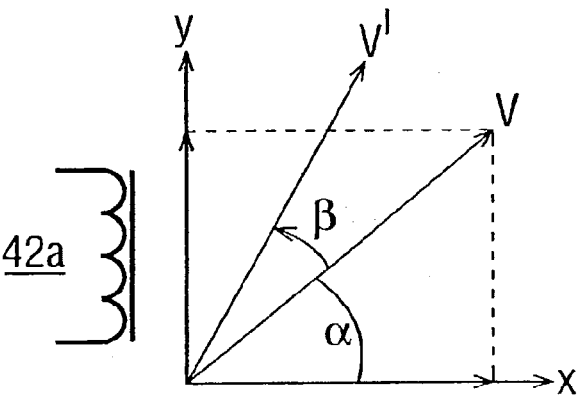

FIG. 6a illustrates a magnetic field vector V which is resolvable into orthogonal x and y components where x and y are the directions of Q—Q and P—P axes of FIG. 1. The vector V is shown at an angle of 45° by way of example though this need not be so. The vector angle to the horizontal (x) is designated a (alpha). Assume that the x and y components are detectable by appropriately oriented directional sensors 42a and 42b respectively. These are exemplified as saturating inductor type sensors. If compressive load force is applied across surfaces 24, 24' (FIGS. 1–3), the vector direction will change or deflect towards the x axis as shown to a position V' so that the detected values of the x and y components change. It appears to be the case that at a quiescent (no load) vector angle α of 45°, the rate of change of amplitude of the x and y components per unit of angular shift (dx/d α. and dy/d α) is at its greatest. If the applied force is tensile, then the vector angle shift will be in the opposite direction as shown by vector V' in FIG. 6b. Another angle that is referred to later is the angle of shift from the quiescent (no load) state. This angle will be generally designated β (Beta).

From this discussion, it may be concluded that even if the vector V were not at 45° with respect to axes P—P and Q—Q, there is likely to be advantage in placing the or each magnetic field sensor at 45° to the local magnetic vector.

The discussion of the operation of the transducer element has been confined so far to responses to forces applied in the direction P—P. The effect of forces applied in the directions Q—Q and R—R needs also to be taken into account.

The transducer element has a null response to forces acting in a direction normal to a magnetized NS region. This is illustrated in FIGS. 7a and 7b which shows a bar magnet NS to which a force F is applied. The force is normal to the plane of the drawing in FIG. 7b. The null response applies to any orientation of the magnet NS in the plane of the paper in FIG. 7b. Thus in FIG. 1, there is a null response to forces applied across surfaces 27, 27' in the direction of axis R—R. Referring again to FIG. 7a, there is a magnetic vector response in the magnet to forces such as F' and F'' which are at an angle to the magnet. If F' and F'' are at 90° to each other, they represent forces applied in the direction of axes P—P and Q—Q respectively to each of the magnets in the transducer element 20.

Thus, the transducer element 20 in FIGS. 1–3 has a magnetic vector response to the stain induced therein by forces acting through the width of the element in the direction of axis Q—Q. In the illustrated examples, where the angle of inclination a is 45°, forces along Q—Q are also at 45° to the inclined planes of the magnetic regions 30 so a response is obtained. This may lead to a problem in some practical applications where forces along axes P—P and Q—Q need to be distinguished. This is dealt with below. At this point, however, it will be explained how the direction of inclination of the magnetic planes relates to the shift in the angle of a magnetic vector.

FIG. 8a shows a transducer block 22 as viewed from one side face, e.g. 27 in FIG. 1, with the angle of inclination of the magnetic region planes 30 running upwardly left to right. The magnetic vector diagram to the right is for the no-load state at a point where the vector is at an angle α of 45°. FIG. 8b illustrates the change in the direction of the magnetic vector V due to a compressive force F in direction P—P. It deflects to V' to decrease a (as in FIG. 6a) by an amount β. FIG. 8c illustrates the change in the same magnetic vector due to a compressive force F in the direction Q—Q. It deflects to V' to increase a by an amount β. The magnetic vector shifts are in accord with a change in inclination of the magnetic planes toward a plane normal to the direction of the applied compressive force. In FIGS. 8b and 8d the inclined magnetic planes 30 are shifted towards the horizontal under the compressive force along P—P. The compressive force along Q—Q on the other hand can be visualized moving the magnetic planes to a more vertical position. It will be understood that the magnetic vector deflections shown will be of opposite sense if the applied forces are tensile.

It is also consistent with the visualization of the shift in plane inclination under applied force described above that a force F in the R—R direction, perpendicular to the plane of the drawing for FIGS. 8a to 8e, is of no effect.

Attention can now be given to various embodiments of the invention. For brevity the transducer element 20 with associated sensors may be referred to as a magnetic force transducer (MFT).

Figure 9:
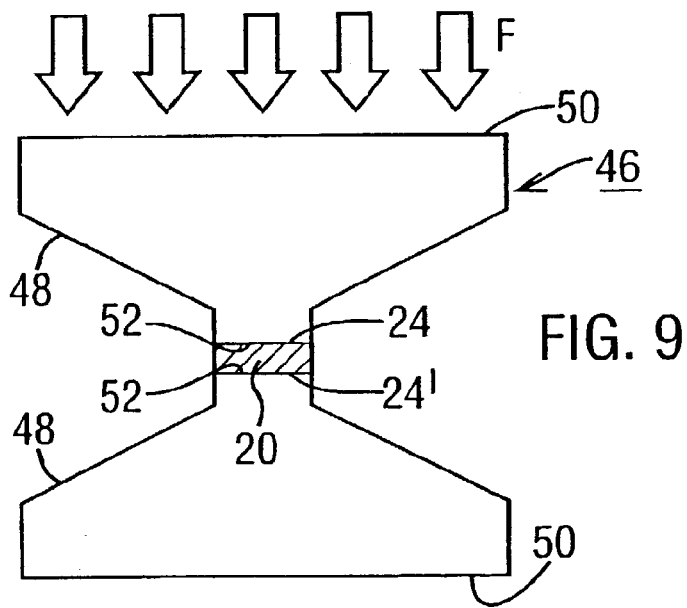
FIG. 9 shows an embodiment illustrating the application of a magnetic force transducer in a load cell.

FIG. 9 shows an application of the MFT in a load cell 46 shown in simplified form. The transducer element 20 is of the basic configuration shown in FIG. 1. The sensor(s) are not shown in the figure. The load cell 46 has a pair of anvils 48 having parallel larger, force (F)-receiving, outer surfaces 50 and a pair of parallel inner surfaces 52 (surfaces 50 and 52 are also parallel) between which the element 20 is mounted to be subject through surfaces 24, 24' to a pressure directly related to the force applied to cell 46. The force F is represented by broad arrows (relative to a reference base in FIG. 8) which form of representation will be used generally in other figures. The anvils 48 are of a non-magnetic material. Sensors can be located in recesses in the element 20 and/or in the anvils 48. Depending on the magnetic paths to be established it can also be contemplated that the anvils are of magnetic material through which the flux loops 43 at least partially extend.

The concept of magnetic vector shifts as a function of strain is not put forward as necessarily a comprehensive explanation of the nature of the magnetic field changes that occur in a magnetic loop cell. Thus, what has been described above should be understood as a contribution towards understanding the magnetic effects which underlie the operation of the transducer element as best known at this time.

Attention will now be given to further embodiments of an MFT with particular regard to sensor placement. It is an advantage to make sensor placement as low a tolerance a procedure as possible. Avoidance of precise positioning is emphasized by the fact that, unlike the drawings used herein for illustration, the magnetic regions are not visually apparent. Further consideration will now be given to preferred sensor array structures that provide more tolerance in the placement of sensors to detect the magnetic field external to a transducer element.

FIG. 10 is a cross-section of a magnetized transducer block 22, where the external field is to be sensed. Arrows 60 indicate the general direction of the external field between the magnetic regions 30 defining cells 43p, 43n as previously described. The external horizontal arrows 60 alternate in polarity at each surface 24, 24' and alternately converge and diverge with respect to the emergence of internal arrows 30 at each surface 24, 24'. The load force (not shown) is applied across surfaces 24, 24'. FIG. 10 shows one direction-sensitive, saturable inductor sensor 62 placed adjacent the lower surface of one cell 43p shown shaded. Sensor 62 is in a position generally corresponding to D4 in FIG. 2. In accordance with the earlier discussion of sensor placement in the Q—Q direction, sensor 62 is taken to be at a position of optimum response. Importantly it is at a position where the field being sensed is of a single polarity. If the sensor were displaced a cell pitch left or right (assuming the cells are of uniform pitch), it would lie in the influence of a single polarity field from a neighboring cell 43n. However, the sensed field would now be acting in the opposite sense. As will become clear shortly the absolute sense of the field is not of significance in the signal processing of FIG. 12. If, say due to erroneous placement the sensor is located a half-cell pitch away from location shown so as to bridge one of the regions 30 (bridging a pair of oppositely directed arrows in FIG. 10), it would be subject to equal but opposite field components from an adjacent pair of cells 43p and 43n producing a null or near null output. It will be appreciated that the single sensor device needs to be positioned with care relative to the transducer block 22 if satisfactory operation is to be achieved.

Figure 12:
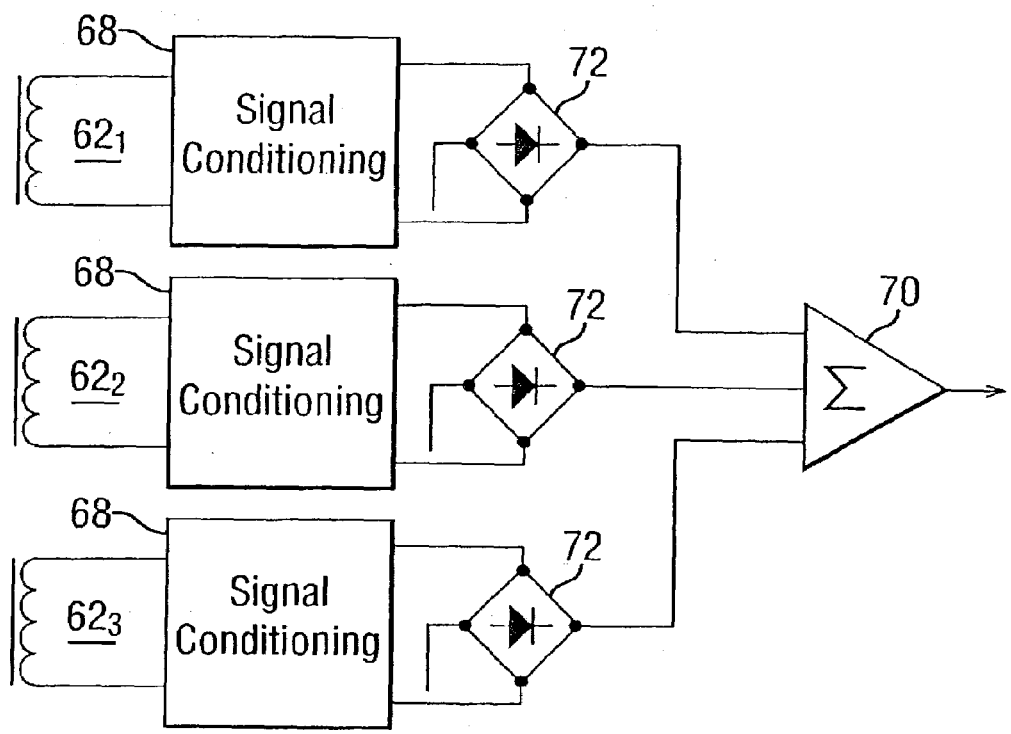
FIG. 12 is a block diagram of signal processing circuitry for the sensor array of FIG. 11.

The sensor placement task can be greatly eased by using an array of sensor devices spaced along at least one of the surfaces 24, 24' at a pitch different to that of the cells 43. That is the array is constructed as a unit with a sensor device pitch as will now be described. The intention is to better ensure that one of the sensor devices will be in an optimum position adjacent a cell. This proposal is illustrated by FIG. 11 in which the block 22 has four cells 43 of alternate field polarity. Each of the external field arrows 60 is considered as having three sections comprised by horizontally adjacent segments NNN or SSS as the case may be. At the lower surface 24' these segments are indicated by three different hatchings 64a, 64b, 64c. It will be understood that the NNN and SSS notation does not indicate magnetic poles for the individual cells but indicates the direction of the external magnetic field adjacent the relevant portion of the cell surface. Closely adjacent the lower surface 24' three horizontally spaced saturable (i.e. in the Q—Q direction) inductor sensor devices 62$_1$, 62$_2$ and 62$_3$ are mounted. Their apparent spacing from surface 24' in FIG. 12 is merely for convenience of illustration. If each cell is taken to be three its long in the Q—Q direction at surface 24', i.e. a cell pitch of three units, then the sensor devices are spaced at a greater pitch, say four units. As illustrated, each sensor device has a saturable inductor core having a sensing length of three units but this is not essential to obtaining the desired result. The sensor devices 62$_1$, 62$_2$ and 63$_3$ are mounted as in a fixed assembly (details of which are not shown) as to be movable as a single entity.

The lower part of FIG. 11 repeats the NNN, SSS sequence at surface 24' but is shaded at 66a, 66b, 66c to indicate which of the field arrow segments 64a,b,c to which each sensor device responds. Device 62$_1$ is fully aligned with a field arrow 60 of a given polarity, e.g. NNN. Device 52$_2$ is offset by four units and partly bridges a 43n and a 43p cell to be influenced by two field arrow portions, SSN. Device 62$_3$ also bridges two cells to be influenced by two field arrow portions, NSS. Thus devices 62$_2$ and 62$_3$ will be subject to some degree of cancellation of the fields acting thereon. It will be realized that FIG. 11 is idealized in assuming that each field arrow is divisible into three segments in each of which the field strength is the same.

However, the staggering of the sensor device pitch with respect to the cell pitch greatly eases the placement of the unit comprising devices 62$_1$–62$_3$ along the surface 24, 24'. If the sensor arrangement were offset one unit to the left in FIG. 11, device 622 would aligned with a field arrow SSS; if the offset is one unit to the right 62$_3$ aligns with a field arrow SSS; for an offset two units to the right, device 62$_2$ aligns with a field arrow NNN. It will be understood that different numbers of cells and sensor devices can be employed with the use of the different staggering of their respective pitches so as to achieve the aim explained above.

Continuing with the four cell, three sensor example, FIG. 13 shows diagrammatically how the three sensor devices 62$_1$, 62$_2$, 62$_3$ can be incorporated into a transducer signal conditioning and measuring circuit. Each saturable inductor and its associated signal conditioning circuit 68 constitute a circuit of the kind described in above mentioned WO98/52063. The individual signal conditioning circuits have their outputs connected as inputs to a summation circuit 60 through respective circuits 72, e.g. full wave rectifier bridges or equivalent devices by which the magnitude of the signal conditioner output is applied to the summation circuit 70 irrespective of its polarity, that is irrespective of the net field polarity acting on a given saturable inductor sensor.

The operation of the summation circuit 70 is to provide an output representing the sum of the next fields sensed by each of the transducer elements of the three-sensor array. The following requirements should be fulfilled:

the magnetic field sensors 62a,b,c as a unit are aligned correctly, i.e. aligned with the horizontal axis Q—Q in FIG. 11; and the spacing ratio between the transducer magnetic cell spacing and the sensor device spacing (the stagger) is constant over the whole arrangement.

The summation circuit of FIG. 12 is found to provide a constant output from the combined signals of the three sensors which is independent of the positioning of the sensor array in the horizontal (Q—Q) direction.

The embodiments described thus far are based on the basic transducer element of FIG. 1. This has a plurality of magnetic regions which are inclined to the direction of strain induced in the body of the element by a force, compressive or tensile, applied across a pair of opposite surfaces of the body. Preferably those surfaces are parallel, such as 24, 24' in FIG. 1. While a rectangular block shape is convenient to manufacture and use it will be understood that the shape may be varied considerably provided that the basic requirements are met. However, the transducer element remains sensitive to forces that may arise in the direction of an axis such as Q—Q in FIG. 1 which also intersects the inclined magnetic regions. Embodiments will now be described in which account is taken of forces applied along axis Q—Q. In considering these embodiments, the explanation of magnetic vector shift given with reference to FIGS. 8a and 8b is pertinent.

A first more complex embodiment is one in which two transducer elements such as shown in FIG. 1 are mounted perpendicularly to one another. They may be formed in a unitary body or separately formed. As above-mentioned they may be part of a structure in which the load to be measured is developed. The embodiment now to be described uses a unitary body.

FIGS. 13a–13c show such a transducer element in which two orthogonal transducer elements 120a and 120b are formed in a single rectangular body 122 of ferromagnetic material. The block 122 has a pair of force-receiving surfaces 124, 124' between which inclined magnetic regions are formed as shown in FIG. 1. For clarity of illustration these regions of alternative polarity are simply indicated by dark lines 130 where they emerge at surface 124. Each transducer element 120a and 120b will provide the magnetic cell structure previously described (alternating cells 43n, 43p). The body 122 also has second and third pairs of opposite faces 126, 126' and 127, 127' respectively. Each transducer element has at least one respective sensor (not shown) associated with it to provide an output representing the detected magnetic field.

The operation of the two transduce elements is further explained with reference to FIGS. 13a–13c each of which shows the block 122 with the applied force indicated by broad arrows F. It is assumed that the force applied across surfaces 124 and 124' is applied equally to both transducers. The axes designations P—P, Q—Q and R—R will be applied with respect to element 120a as they are in FIG. 1. This is not the sequence of axes applicable to element 120b. For convenience the axial designations x, y and z will be used for the whole assembly equating to the axes Q—Q, P—P and R—R respectively for element 120a. Also FIGS. 13a—13c show vector diagrams for the forces F indicated. The vector diagrams relate to element 120a at the left and 120b at the right. It is assumed the quiescent (no force) vector V is at 45°.

FIG. 13a shows force F applied in the y direction between faces 124 and 124'. Both elements respond equally so that the magnetic vector V is shifted by β towards the x-axis as shown by V'. The detector signal from either element can be used for force measurement or the two combined. FIG. 13b shows the response to a force in the x direction. It affects element 120a to shift the magnetic vector through β to V', i.e. towards the y axis but as regards element 120b it lies in the equivalent of the R—R axis of FIG. 1 so that there is no vector shift. On the other hand in FIG. 13c the force F in the z axis direction is along the R—R axis of element 120a so that no vector shift ensues but the vector is shifted as indicated by V' toward the y axis for element 120b.

If force components are present m the x-y plane, i.e. along both the y and x axes, the element 120b will respond to the y-axis component Fy but not to the x-axis component Fx. The element 120a will respond to the Fy component and also to the x-axis component Fx. These two components act to produce a vector shift β in opposite directions. If the transfer function of each element is known the Fx and Fy components can be resolved. A similar converse situation arises for a force vector in the x-z plane.

If force components Fx and Fz are present in the x-z plane, then the orthogonally positioned elements 120a, 120b can resolve them but ambiguity arises. It will be noted that in the x-y and y-z planes, one transducer element responds only to y direction forces, the other responds to forces having components in both y and x or y and z directions as the case may be. However, in the x-z plane both transducers respond to forces having components in both x and z directions.

It will be seen that the response in the x-z plane repeats at 90° intervals. Ambiguity arises when a force is applied in either of the two directions at 45° to the x and z-axes. The equal response of the two transducer elements 120a, 120b in this case can also be obtained by a force applied solely in the y direction affecting each transducer element equally.

Figure 14:
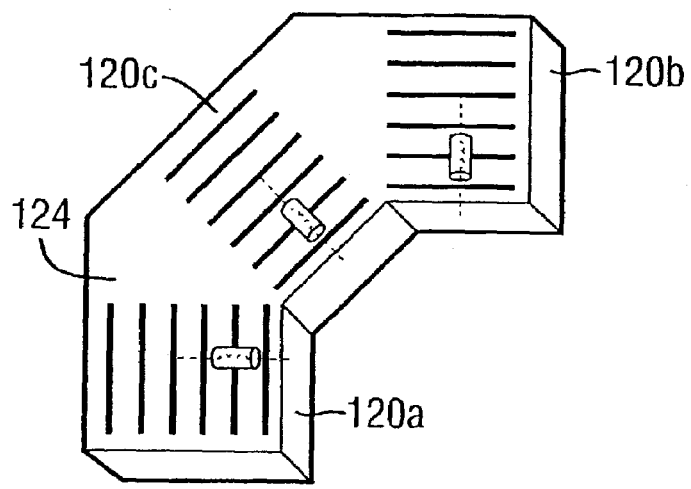
FIG. 14 shows a three-element transducer body structure in which a third element is located to aid in resolving ambiguities arising from the structure of FIGS. 13a–13c.

A resolution of this ambiguity is obtainable using the three transducer element structure of FIG. 14 in which a third transducer element 120c at an angle to the elements 120a and 120c is introduced. It is conveniently at 45° to both, is of the same structure and has an identical form of detector. That is that all three transducers have the same transfer functions referred to their own individual orientations. FIG. 14 shows one possible manner in which the three transducer elements are formed in a single body. They share the same P—P direction but the local Q—Q and R—R directions of element 120c are 45° to those of each of elements 120a, 120b. By using proper computational techniques it may be possible to use just two transducer elements.

Figure 15:
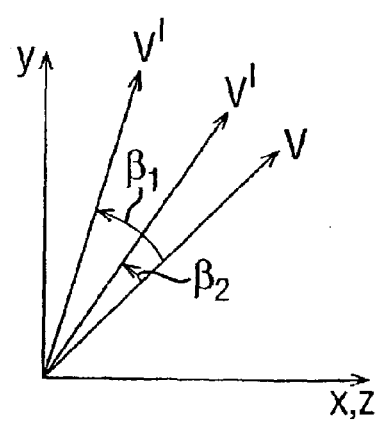
FIG. 15 is a magnetic vector diagram illustrating certain vector angle values.
Figure 16:
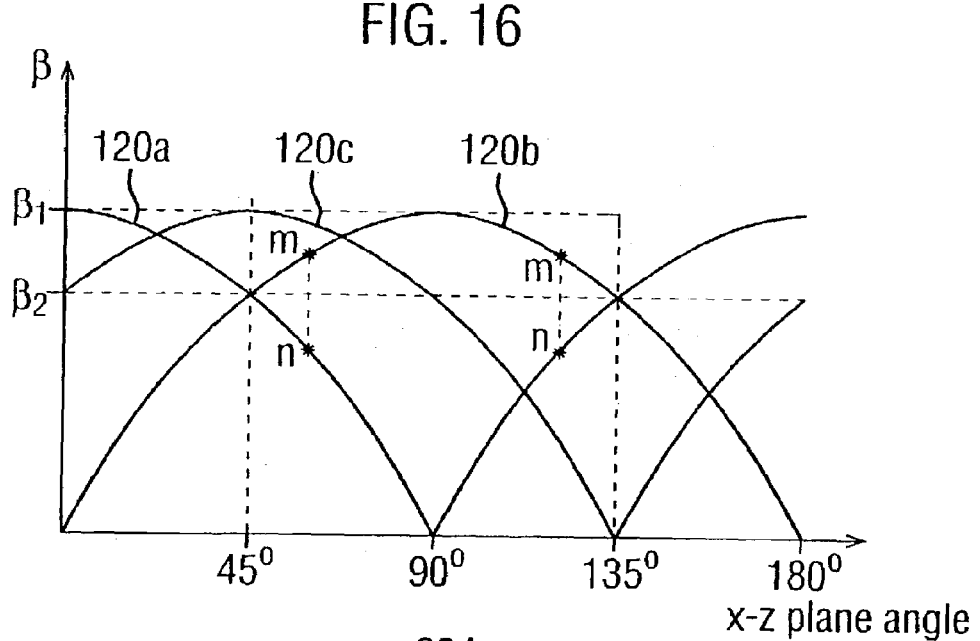
FIG. 16 is a graphical representation of vector shift angle β as a function of the angle of a force applied in the x-z plane.

Before considering further the use of a third transducer element, reference is made to FIG. 15 which is a magnetic vector diagram applicable to any transducer element. Assume that for a fixed given force in the Q—Q, R—R plane for the element in question, the maximum response from a transducer element is an angular shift (away from the quiescent 45° vector V) of $\beta_1$, while the angular shift in response to the force being at an angle of 45° to the maximum response axis for the element (i.e. the Q—Q axis as localized for that element), is a lesser angle $\beta_2$. The general shift angle β plotted as a function of the direction of the force over the 180° arc is going to be something as shown in FIG. 16. The shift angle responses of elements 120a and 120b will vary between 0 (zero) and $\beta_1$ and the curves will be spatially 90° apart in the x-z plane. At both 45° and 135°, the responses are equal at $\beta_2$. It will be seen that any pair of corresponding β values for elements 120a, 120b, e.g. m and n, will be repeated over the 180° arc. The ambiguity can be resolved by the response of the third element 120c which lies at 45° spatially between the other two. Thus, for example, at 45° and 135°, the response of element 120c is at a maximum $\beta_1$ and a minimum 0 (zero) respectively to resolve the ambiguity that would otherwise arise. The value of the 120c curve is also used to resolve the ambiguity of the m, n value. Consequently the required direction information for the applied force can be obtained by processing detector signals from the three transducer elements. This can be employed generally by using normalizing to take out the actual force dependent β values.

The above discussion is given for explanatory purposes. It is not put forward as completely definitive. It assumes that the transducer is being operated well within its elastic limits and without hysteresis. In practice the range of β is expected to be small in absolute terms. The shape of the response curves of FIG. 16 may vary. For example, they may be more linear than illustrated but would retain the characteristic of a zero β at two angular values, e.g. 0° and 180° for the 120b curve and rising to a maximum between them, e.g. at 90°. In each response the maximum is at 90° to the minimum.

Figure 17A:
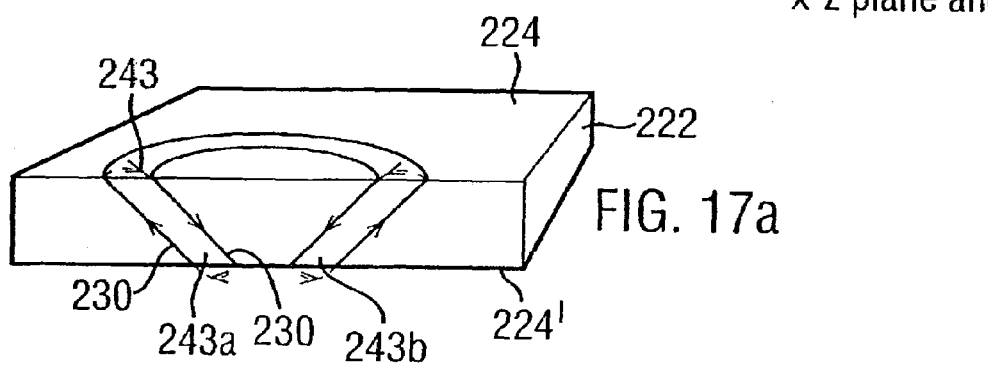
FIGS. 17a and 17b illustrate another embodiment of a transducer element based on an annular rather than a linear structure.
Figure 17B:
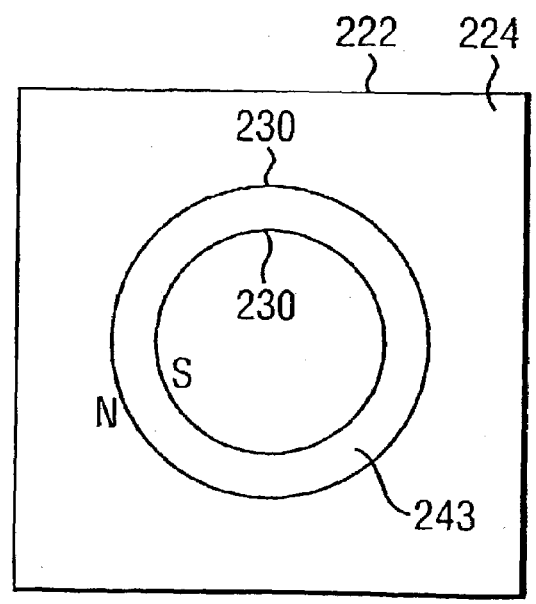

Other variations of magnetic cells within an MFT structure are possible. FIGS. 17a and 17b show a section through and a plan view of a transducer block 222. A magnetic cell 243, defined between magnetized regions extends between surfaces 224 and 224'. It is of circular form—other annular shapes are feasible. The shape tapers, e.g. at 45°, from one surface 224 to the other 224' so that in any diametric section through the cell 243 there is a magnetic cell as seen in FIG. 17a having a pair of oppositely sloping magnetic cell portions 243a, 243b. The block 222 can in fact be of any thickness as previously discussed-ranging from a thin coating to significant thickness of 1 cm or more. The external fields of cell portions 243a, 243b (the magnitude of which relative to any internal field will depend on various parameters as previously discussed) are oppositely directed at the external surfaces 224, 224' as shown by the dashed arrows as part of a closed loop magnetic field. The ratio of internal to external flux closing the loop will depend on the factors described with reference to FIGS. 2 and 3. The cell will respond to forces applied vertically (normally to the plane of FIG. 17b) or to horizontally applied forces (in the plane of FIG. 17b). The circular arrangement of FIGS. 17a and 17b enables a response to vertical forces or horizontal forces to be obtained. Magnetic field detectors are not shown in FIGS. 17a and 17b but they can be located in accordance with the teachings given above and such as those described in connection with FIG. 2.

The practice of the invention has been described in relation to the detection and measurement of linear forces. However, the practice of the invention also has application in which torque is to be measured. A transducer element of the kind described above can be applied in a system subject to torque where the transducer element is subject to a torque-dependent strain. A more specific application for say rotating shafts is to bond a flexible transducer element of the invention, e.g. a tape, around a shaft, i.e. around the whole circumference or a portion of it so that it is subject the torque developed in the shaft. Detector means can be mounted with the shaft though with the usual preference for non-contacting sensors, the latter can be used with signal processing to separate the wanted torque-representing signal from components related to the shaft rotation.

By applying the physical phenomenon above described to different shapes of magnetizable transducers, together with the use of appropriate sensors, the principles described above can be applied in

| | |
|---|---|
| Load Cells | Accelerometers |
| Torque Sensors | Mechanical Power Sensors |
| Pressure Sensors | Material Diagnostics and Analysis |
| Bending and Sheering Sensors | Force Sensors |

One particular force application is to measure the force between an aerofoil, e.g. an aircraft wing, and a fluid, e.g. air, passing over the aerofoil. Thus visualizing a measurement in the P—P direction of FIG. 2, the surface 124' is mounted in contact with the aerofoil: the surface 124 is subject to the medium flowing over the aerofoil.

The transducer elements have so far been described as independent bodies which are mountable to or in a structure in which a load to be measured is developed. However, a transducer element embodying the invention may, in some circumstances, be an integral part of a structure and, for example could be formed in an existing structural part where the part is of ferromagnetic material. Instances of such implementation might be a ferromagnetic structural part of a building or the hull of a vessel where the hull is of ferromagnetic material. A transducer element may, of course, be incorporated as an integral part of a structure.

For reliable operation, it is important to be aware that in practical applications, other factors need to be kept in mind which may adversely affect or limit the use of a particular transducer element, namely:

1. High temperature near the Curie point. The Curie point is a temperature at which the material of the element will loose all its stored magnetic information. Basically the transducer element becomes non-magnetic. For most materials that are applicable in industrial applications in the Curie point is in the region of 600° C. and above (>1000° C.). However when approaching the Curie point the magnetic memory loss effect begins to act on the transducer element. The transducer element should be kept well below the Curie point, e.g. <300° C.
2. Strong magnetic fields above the magnetization or demagnetization level. As magnetic energy is needed to magnetize the transducer element, magnetic energy can damage or even destroy the wanted effects of the transducer. Depending on the transducer element material (alloy composition, its hardening level, and the time the transducer is exposed to interfering magnetic fields), a specific amount of magnetic field strength is needed to either store or erase magnetic information stored in the transducer element. For many materials the minimum threshold level is above 50 Gauss or more. However a lower level may cause damage if the transducer is exposed to these levels for a very long time and/or mechanical stresses are applied at the same time;
3. Excessive mechanical force which causes permanent changes in the physical structure of the transducer element at a molecular level. The sensing technology now proposed appears to be very sensitive to changes of the crystal structure of the transducer element material. After the element has been created (magnetically programmed), any permanent changes of the crystal structure inside the actual transducer region will probably result in a change of the measured magnetic signal; and
4. Electric current flowing through the transducer element. The electrical current flowing through a conducting material will create a magnetic field in proportion to the electrical current strength and the cross-section area of conductive material the current is flowing through. When this magnetic field exceeds a certain threshold level then the magnetic state of the transducer element can be changed or even erased.

The technology now proposed can be applied to any material that can be magnetized or shows measurable interactions with magnetic fields. In the case of a self-sustainable transducer system, the material used has to have a magnetic memory, i.e. the material should maintain its magnetic field strength permanently after it has been magnetized.

When applying the now-proposed technology the transducer element material should have durable and reliable characteristics mechanically.

Many steels will fit into this category as long as they have additional impurities included. Work to date indicates that satisfactory results are achieved when Nickel is present in a low percentage. Too much or too little Nickel will result in non-linear measurement signal or even create a large hysteresis effect. Adding Cobalt will increase the sensor durability and remanence of the stored magnetic fields. The exact percentage of each of these impurities may have considerable effects on the final transducer performance.

To reduce the possible effects of measurement hysteresis the transducer element can be hardened before the magnetization process.

Figure 18A:
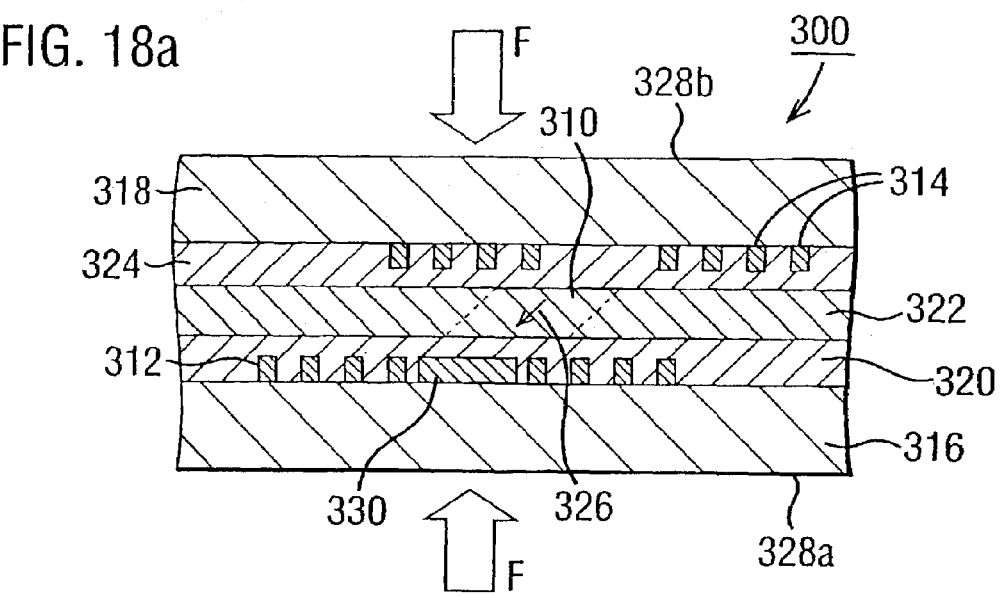
FIGS. 18a and 18b illustrate yet another embodiment having integral coils to establish a magnetic field.
Figure 18B:
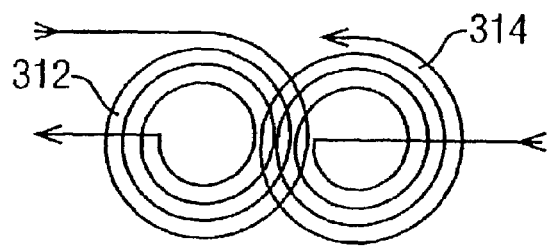

A different implementation of the invention is shown in FIGS. 18a and 18b. It is an implementation which takes advantage of techniques known in the semiconductor and integrated circuit fields. FIG. 18a is a section through an integrated sensor device and FIG. 18b is a plan view illustrating the arrangements of spiral coils used in the device.

Referring to FIG. 18a the device 300 comprises a sandwich of a ferromagnetic core portion 310 (indicated by dashed lines) between two flat spiral coils 312 and 314 supported on spaced substrate bodies 316 and 318 respectively.

In FIG. 18a, the first spiral coil 312 is formed on a substrate portion 316 and is overlaid with an insulator layer 320 deposited over the substrate surface. That in turn is overlaid by a ferromagnetic film 322 containing nickel, for example 4–8% of nickel. Another layer 324 of insulating material is deposited over the film to electrically isolate it from film 322. The isolation requirement depends on the conductivity of the film. Supported on insulating layer 324 is the second spiral coil 314 laterally offset from coil 316 as seen in the plan view of FIG. 18b so that by appropriate polarity of energization of the coils a magnetic path 326 is established through the ferromagnetic film 318 in the core portion 310 of the film. The induced magnetic field and the core portion are at an angle to the film surfaces, preferably a 45° angle as described for the earlier embodiments. The upper coil 314 is in turn overlaid by the second substrate portion 318. The two outer substrate surfaces 328a, 328b define load F receiving surfaces at 45° to the magnetic field established between the coils 312 and 314.

Also embedded in the structure is a sensor device 330 adjacent the core portion 310 to respond to magnetic flux emanated thereby. A Hall effect device is particularly suitable for this purpose because of its small size as abovementioned.

The operation of the structure is as follows. The coils 312 and 314 are appropriately energized to provide opposite poles with respect to film 318 and thereby establish a magnetic field (326) in the core portion 310. The initial energization is done under no load conditions or with a predetermined load applied across surfaces 328a, 328b. The initial energization is switched off and a reference output obtained from the sensor 330 at the no-load or predetermined load condition. The load to be pleasured is then applied and the output of the sensor 330 again measured to obtain the applied load-representing value.

An alternative method of measurement is to connect the two spiral coils in series to provide with the core portion 310 of the film the saturating inductor L of a sensor device of the kind described in the above-mentioned WO98/52063. The series connection is made so that the coils have opposite magnetic polarity with respect to core portion 310. This alternative is attractive in that the sensor circuitry can itself be implemented in integrated circuit form.

The structure described can have additional pairs of offset coils 312 and 314, the pairs being spaced laterally. As indicated above the isolation layer between the film and each substrate may not be necessary. Each coil could be formed on its respective substrate and the two substrates brought together to sandwich the film 318 between them.

Figure 18C:
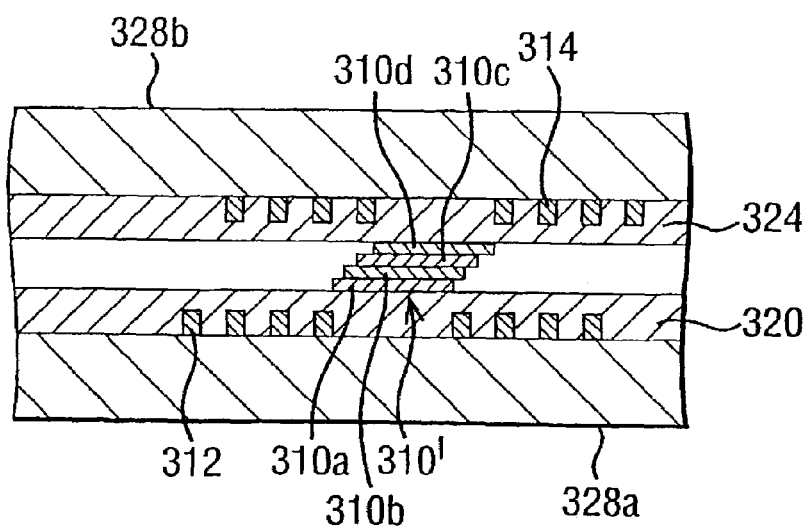

An alternative core structure is illustrated in FIG. 18*c* in which the core 310' is a discrete entity between the or each pair of spiral coils 312 and 314. The core 310' is angled to align with the magnetic field between the coils and to this end is formed of successively offset layers such as 310*a*, 310*b*, 310*c*. The core may be surrounded by non-ferromagnetic material (not shown) to support the core.

The invention claimed is:

1. A force-sensitive transducer element comprising:
   a structure having a pair of opposite surfaces for receiving a force to be applied to the structure and defining a force-transmitting direction through the structure,
   said structure comprising at least one body of magnetic material, said at least one body having at least first and second magnetized regions in said at least one body extending generally in parallel at an angle to said force transmitting direction, said first and second magnetized regions being of opposite polarity of magnetization to act to establish a closed magnetic loop, in which said magnetized regions are magnetized to saturation.

2. A force-sensitive transducer element as claimed in claim 1 in which said pair of opposite surfaces are surfaces of one of said at least one body or are surfaces of more than one of said at least one body.

3. A force-sensitive transducer element as claimed in claim 1 in which said angle is substantially 45°.

4. A force-sensitive transducer element as claimed in claim 1 in which said structure comprises two bodies the respective magnetized regions of which are at an angle to respective axes perpendicular to said force-transmitting direction, and said respective axes are at an angle to one another.

5. A force-sensitive transducer element as claimed in claim 4 in which said respective axes are orthogonal to one another.

6. A force-sensitive transducer element as claimed in claim 4 in which said respective axes are at 45° to one another.

7. A force-sensitive transducer element as claimed in claim 1 in which said structure comprises three bodies, the respective magnetized regions of which are at an angle to respective axes perpendicular to said force-transmitting direction, and wherein two of said respective axes are orthogonal to one another and the third of said respective axes is at an angle to the other two of said respective axes.

8. A force-sensitive transducer element as claimed in claim 7 in which the third of said respective axes is at an angle of 45° to each of the other two of said respective axes.

9. A force-sensitive transducer element as claimed in claim 4 in which said two bodies are contained within or are integral within a unitary structure.

10. A force-sensitive transducer arrangement as claimed in claim 1, further comprising a second pair of magnetized regions each extending an angle to the direction of induced strain, the two regions of the second pair being of alternate magnetic polarity to act to establish a closed magnetic loop between each next adjacent pair of regions.

11. A force-sensitive transducer element as claimed in claim 1 further comprising magnetic seal regions in which said at least one body is sufficiently thin in the force-transmitting direction that essentially no magnetic loop between said first and second magnetic seal regions or between a pair of next adjacent magnetized regions, can be closed within the magnetic material, whereby the magnetic flux closing said magnetic loop is exterior to the material.

12. A force-sensitive transducer arrangement comprising a force-sensitive transducer element as claimed in claim 1 and a respective magnetic field detector device located in each of said at least one body to sense force-dependent changes in the magnetic flux in the magnetic loop associated with each of said at least one body.

13. A force-sensitive transducer arrangement comprising a force-sensitive transducer element as claimed claim 1 and a respective magnetic field detector device located adjacent each of said at least one body to sense force-dependent changes in the magnetic flux in the magnetic loop associated with each of said at least one body.

14. A force-sensitive transducer element comprising a structure having a pair of spaced apart, substantially parallel surfaces for receiving a force to be applied substantially normally thereto and defining a force-transmitting direction through the structure, said structure comprising a body of magnetic material, at least one pair of coils spaced apart in said force-transmitting direction and spaced apart laterally with respect to said force-transmitting direction to define between the coils of said pair a magnetic path through said magnetic material that is at an angle to said force-transmitting direction.

15. A force-sensitive transducer element as claimed in claim 14 in which said coils are connected in series for generating a pair of poles of opposite polarity to magnetize a region of the magnetic material extending along said magnetic path.

16. A force-sensitive transducer element as claimed in claim 14 further comprising a magnetic field detector device, preferably located adjacent at least one coil, to provide a signal representing the magnetic field in a region of said magnetic material extending along said path.

17. A force-sensitive transducer arrangement comprising a force-sensitive transducer element as claimed in claim 15 in which the series connected coils are connected to provide an inductor of a saturating inductor type of magnetic field sensor.

18. A force-sensitive transducer element comprising a structure made of magnetic material and having at least one magnetized region therein, said magnetized region having a pair of opposite surfaces for receiving a force to be applied to the structure and defining a force-transmitting direction through the structure, wherein said magnetized region therein extends at an angle to said force-transmitting direction.

19. A force-sensitive transducer element as claimed in claim 1, wherein the transducer element is made from a flexible material and bonded to a shaft on which torque is applied such that the linear forces measured by the transducer element are translated to the torsional load applied to the shaft.

20. A force-sensitive transducer arrangement as claimed in claim 10 in which the or each magnetized region is at 45° to the direction of the induced stress.

21. A force-sensitive transducer arrangement as claimed in claim 10 in which said force-sensitive transducer element is made of a flexible material.

22. A force-sensitive transducer arrangement as claimed in claim 21, wherein said flexible material is a tape.

23. A force-sensitive transducer element comprising:
a structure having a pair of opposite surfaces for receiving a force to be applied to the structure and defining a force-transmitting direction through the structure, said structure comprising at least one body of magnetic material, said at least one body having at least first and second magnetized regions in said at least one body extending generally in parallel at an angle to said force transmitting direction, wherein said magnetized regions are magnetized to saturation.

24. A torque-sensitive transducer element comprising:
a structure having a pair of opposite surfaces for receiving a force to be applied to the structure and defining a force-transmitting direction through the structure, said structure comprising at least one body of magnetic material, said at least one body having at least first and second magnetized regions in said at least one body extending generally in parallel at an angle to said force transmitting direction, wherein said magnetized regions are magnetized to saturation.

25. A torque-sensitive transducer arrangement as claimed in claim 24, further comprising a second pair of magnetized regions each extending an angle to the direction of induced strain, the two regions of the second pair being of alternate magnetic polarity to act to establish a closed magnetic loop between each next adjacent pair of regions.

26. A torque-sensitive transducer arrangement as claimed in claim 25 in which the or each magnetized region is at 45° to the direction of the induced stress.

27. A torque-sensitive transducer arrangement as claimed in claim 25 in which said torque-sensitive transducer element is made of a flexible material.

28. A torque-sensitive transducer arrangement as claimed in claim 27, wherein said flexible material is a tape.

* * * * *